No. 739,456. PATENTED SEPT. 22, 1903.
C. R. SWISHER.
MILK PASTEURIZER AND COOLER.
APPLICATION FILED JUNE 25, 1903.
NO MODEL. 2 SHEETS—SHEET 1.
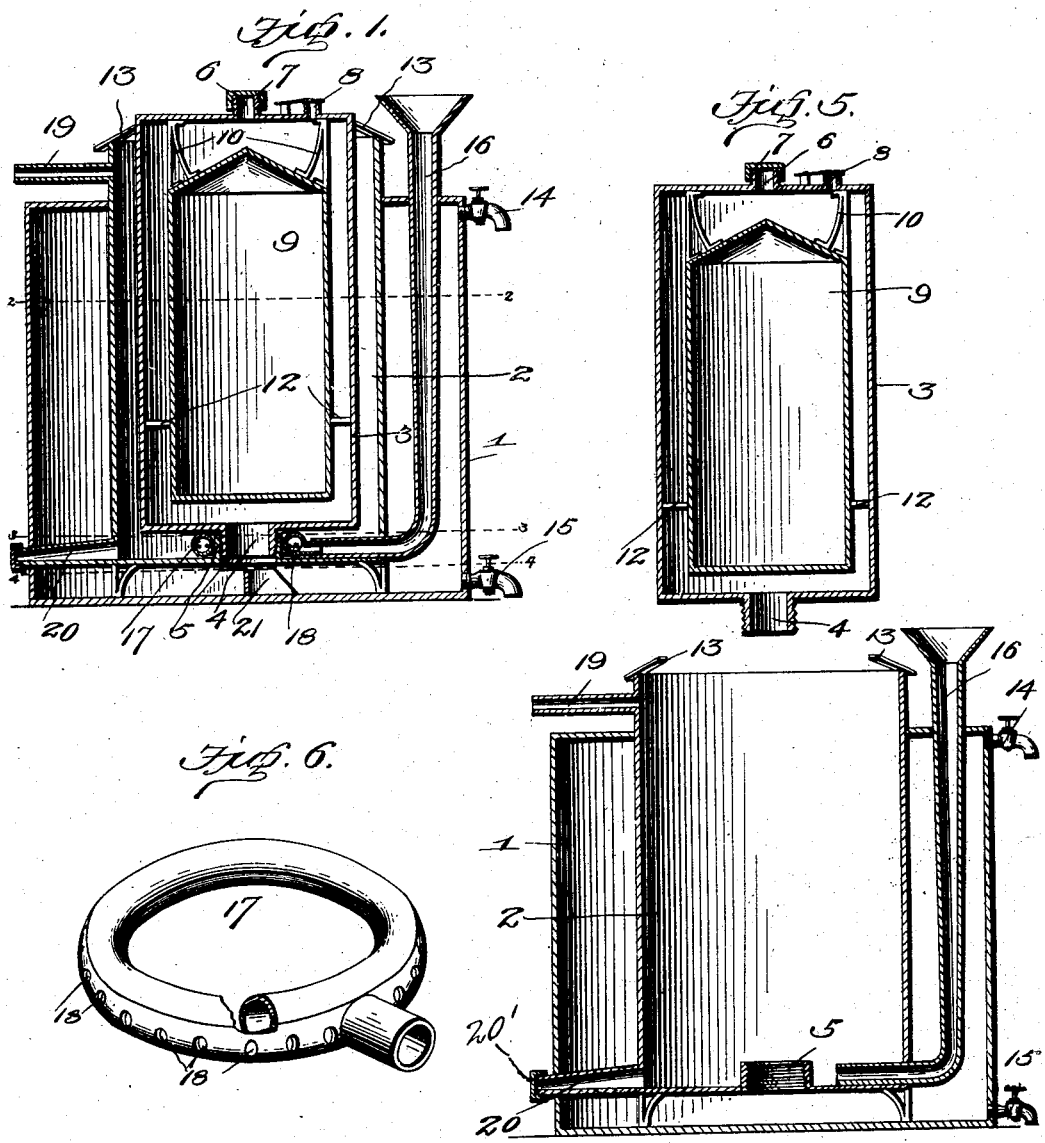

No. 739,456. PATENTED SEPT. 22, 1903.
C. R. SWISHER.
MILK PASTEURIZER AND COOLER.
APPLICATION FILED JUNE 25, 1903.
NO MODEL. 2 SHEETS—SHEET 2.
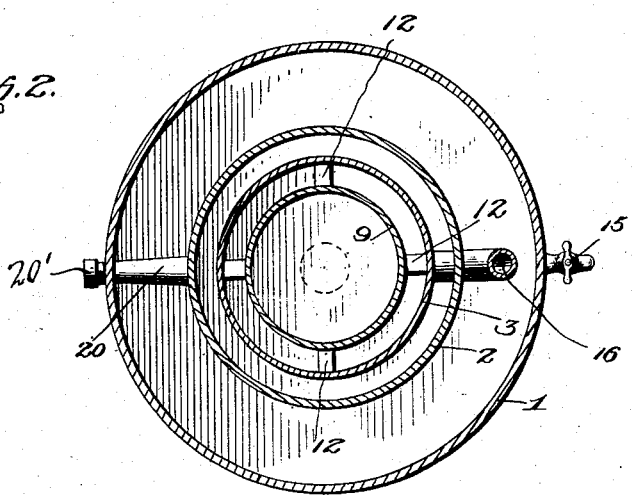
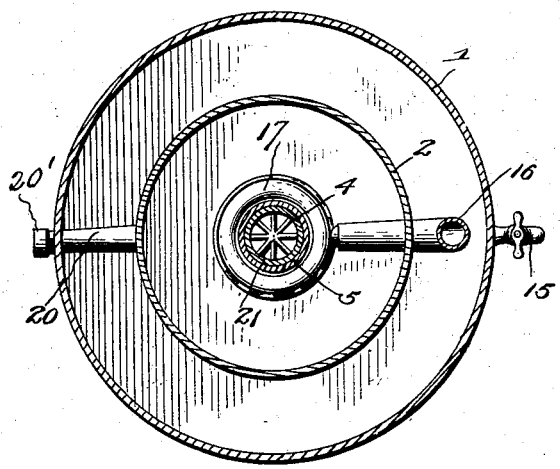 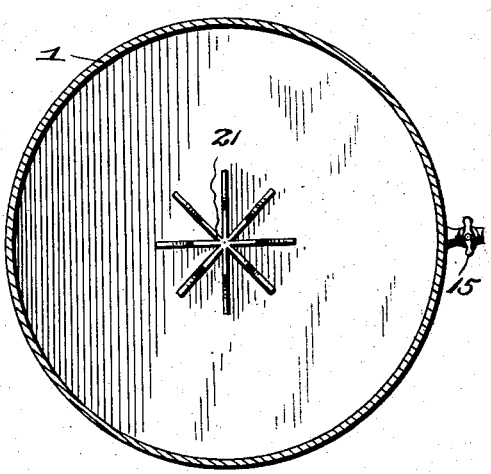
Witnesses
Inventor
C. R. Swisher
By H. B. Wilson
Attorney No. 739,456. Patented September 22, 1903.

UNITED STATES PATENT OFFICE.

CHARLES ROSS SWISHER, OF WELLINGTON, KANSAS.

MILK PASTEURIZER AND COOLER.

SPECIFICATION forming part of Letters Patent No. 739,456, dated September 22, 1903.

Application filed June 25, 1903. Serial No. 168,092. (No model.)

*To all whom it may concern:*

Be it known that I, CHARLES ROSS SWISHER, a citizen of the United States, residing at Wellington, in the county of Sumner and State of Kansas, have invented certain new and useful Improvements in Milk Pasteurizers and Coolers; and I do declare the following to be a full, clear, and exact description of the invention, such as will enable others skilled in the art to which it appertains to make and use the same.

This invention relates to improvements in devices for pasteurizing and cooling milk.

The object of the invention is to provide a device of this character by which milk may be thoroughly pasteurized and afterward quickly cooled.

Another object is to provide means in a device of this character whereby the milk or cream may be evenly distributed, so that all parts will be treated alike; also, to provide means for the even distribution of the pasteurizing and cooling elements.

A further object is to provide a device of this character which will be simple in construction, strong and durable, easily taken apart for cleaning, inexpensive, and well adapted to the use for which it is designed.

With these and other objects in view the invention consists of certain novel features of construction, combination, and arrangement of parts, as will be more fully described, and particularly pointed out in the appended claims.

In the drawings, Figure 1 is a vertical sectional view of the device complete. Fig. 2 is a horizontal sectional view on the line 2 2 of Fig. 1. Fig. 3 is a similar view on the line 3 3 of Fig. 1. Fig. 4 is a similar view on the line 4 4. Fig. 5 is a vertical sectional view of the device, showing the parts separated for cleaning purposes. Fig. 6 is a detail view of the milk or cream distributing cup.

Referring more particularly to the drawings, 1 denotes an outer tank closed on all sides, and 2 denotes a second tank of less diameter than the tank 1 and arranged within the same, the tank 2 being provided with feet or supports which hold the same above the bottom of the tank 1.

3 denotes a tank of less diameter than the tank 2 and arranged within the same. The tank 3 is provided at its lower end with an outlet-opening surrounded by a depending screw-threaded neck 4, which is adapted to be screwed into engagement with an upwardly-projecting collar or flange 5, formed on the bottom of the tank 2 and surrounding an opening in said bottom, whereby communication is made between the interior of the tank 3 and the space between the tanks 1 and 2.

6 denotes an inlet or filling opening formed in the top of the tank 3 and closed by a screw-cap 7, a safety-valve 8 also being arranged in the top of the tank 3 to permit the escape of steam should the pressure from the same become too great.

9 denotes a hollow drum having a conical-shaped top 10. The drum 9 is suspended centrally within the inner tank 3 by hangers 10 and spaced from the sides of the tank 3 and held in position by braces 12. The object of this drum is to occupy the space in the center of the tank 3, thereby diminishing the water-space, which will lessen the amount of water required to fill the tanks. This arrangement greatly facilitates the heating of the water and at the same time holds the same against all parts of the tank 3, so that the milk or cream which occupies the space between the walls of the tanks 2 and 3 becomes quickly heated and pasteurized.

13 denotes braces arranged on the upper end of the tank 2 and bearing on the upper end of tank 3 to steady the same.

14 denotes an overflow-faucet arranged near the upper end of the tank 1, and 15 denotes a draw-off faucet arranged near the lower end of the tank 1, by which the water in the tanks 1 and 3 may be drawn out.

16 denotes a milk or cream inlet tube, which passes down through the tank 1 and is provided at its lower end with an elbow and a laterally-projecting end, which passes through the wall of the tank 2 and into the space between the bottom of said tank and the tank 3.

17 denotes a cream or milk distributing cup which consists of a tubular or hollow ring provided around its outer side with a series of perforations 18. The upper portion of the ring is in the form of a cap or cover which is screwed on or otherwise secured to the bottom portion, so that the two portions may be separated for cleaning. On one side of the cup is secured a laterally-projecting nipple by which the cup is connected to the end of the inlet-tube 16. The cup 17 is adapted to encircle the collar or flange 5 on the bottom of the tank 2, and the perforations 18 in the same communicate with space between the cans 2 and 3, so that when milk or cream is introduced into the tube 16 it will flow out of said openings in all directions, thereby insuring an even distribution of the same through the space between the cans. The upper end of the filling-tube is flaring or funnel shape, and milk or cream may be introduced into the same from a tank or any other suitable source of supply.

19 denotes an overflow-spout arranged in the upper end of the tank 2 and communicating with the milk-space between the tanks 2 and 3. The milk or cream rises in this space and becomes heated by contact with the heated walls of the tanks 2 and 3, and when it reaches the spout 19 it overflows through said spout and discharges into a suitable receptacle.

20 denotes a draw-off spout projecting through the walls of the tanks 1 and 2 and communicating with the lower end of the milk-space, whereby the milk in said space may be entirely drawn out. The outer end of the spout 20 is normally closed by a screw-threaded cap 20'.

When it is desired to cool the milk, the hot water in the tanks 1 and 3 is drawn off through the faucet 15 and cold water is run into the tanks in any suitable manner through the inlet-opening 6 and striking the conical-shaped top of the drum 9 will be directed to all sides of the same, running down between the inner walls of the tank 3 and the walls of the drum through the opening in the neck 4 and into the tank 1, where it rises in the space between the cans 1 and 2 and overflows through the faucet 14. The milk or cream is again introduced into the upper end of the tube 16 and directed thereby into the space between the cans 2 and 3, where it rises and is again discharged through the spout 19, as before. A continuous flow of water through tanks, as just described, will quickly cool the milk as it passes through the space between the same.

21 denotes a water divider or spreader consisting of a series of plates radiating from a common center. The spreader is arranged in the space between the bottoms of the tanks 1 and 2 immediately below the opening between the tanks 2 and 3, formed by the neck 4 and collar 5, so that as the water runs down the tank 3 and through the said opening it will strike the spreader 21 and be directed in all directions between the bottoms of the tanks 1 and 2 by the radiating plates of the spreader, so that all parts of the tanks will be reached by the water.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. A device of the character described, consisting of a series of tanks arranged one within the other forming alternating spaces for water and milk or cream, means for evenly distributing the milk or cream introduced into the space for the same and means for spreading the water introduced into said water-spaces, whereby the same will be brought into contact with the walls of said spaces, substantially as described.

2. In a device of the character described, the combination with an outer water-tank of a milk or cream tank arranged within said outer tank, an inner water-tank arranged within said milk or cream tank to form a space between the bottom and side walls of said tanks, and removably connected at its lower end to the bottom of said milk or cream tank and communicating with the space between said milk-tank and said outer water-tank, means for filling and distributing the milk or cream in said milk-tank, overflow and draw-off spouts arranged at the upper and lower ends of said milk-tank, and means for spreading the water introduced into said water-tanks, substantially as described.

3. A device of the character described, consisting of an outer water-tank closed on all sides, an intermediate milk or cream tank having a centrally-disposed opening formed in its lower end surrounded by an upwardly-projecting screw-threaded flange, an inner closed water-tank having formed in its lower end a centrally-disposed opening surrounded by a depending screw-threaded neck engaging said threaded flange whereby said inner water-tank is removably connected to said milk-tank and communication is afforded between said inner and outer tanks, a milk-distributing cup arranged around said flange and having perforations communicating with the lower end of said milk-tank, a filling-tube connected with said distributing-cup, a drum arranged within said inner water-tank and a water-spreader arranged in said outer water-tank, to receive and spread the water passing from said inner to said outer tank, and, overflow and draw-off spouts and faucets suitably arranged in said milk and water tanks, substantially as described.

In testimony whereof I have hereunto set my hand in presence of two subscribing witnesses.

CHARLES ROSS SWISHER.

Witnesses:
ELSIE BROWN,
HENRY WHITSON.